United States Patent
Blott et al.

(10) Patent No.: US 10,783,664 B2
(45) Date of Patent: Sep. 22, 2020

(54) METHOD FOR SETTING A CAMERA

(71) Applicant: Robert Bosch GmbH, Stuttgart (DE)

(72) Inventors: Gregor Blott, Salzgitter (DE); Jan Rexilius, Hannover (DE)

(73) Assignee: Robert Bosch GmbH, Stuttgart (DE)

( * ) Notice: Subject to any disclaimer, the term of this patent is extended or adjusted under 35 U.S.C. 154(b) by 160 days.

(21) Appl. No.: 16/021,591

(22) Filed: Jun. 28, 2018

(65) Prior Publication Data
US 2019/0005681 A1 Jan. 3, 2019

(30) Foreign Application Priority Data
Jun. 29, 2017 (DE) .............................. 10 2017 211 038

(51) Int. Cl.
| | |
|---|---|
| G06K 9/00 | (2006.01) |
| G06T 7/80 | (2017.01) |
| G06T 7/11 | (2017.01) |
| G06T 7/70 | (2017.01) |
| G06K 9/32 | (2006.01) |
| G06T 3/40 | (2006.01) |
| G06T 7/60 | (2017.01) |

(52) U.S. Cl.
CPC .............. *G06T 7/80* (2017.01); *G06K 9/3241* (2013.01); *G06T 3/40* (2013.01); *G06T 7/11* (2017.01); *G06T 7/60* (2013.01); *G06T 7/70* (2017.01)

(58) Field of Classification Search
None
See application file for complete search history.

(56) References Cited

U.S. PATENT DOCUMENTS

| 5,063,603 A * | 11/1991 | Burt .................... G06K 9/00255 382/115 |
|---|---|---|
| 5,465,308 A * | 11/1995 | Hutcheson ............. G06K 9/522 382/159 |
| 6,594,600 B1 * | 7/2003 | Arnoul ............... G01B 11/2755 382/154 |
| 7,774,075 B2 * | 8/2010 | Lin ........................ G06F 3/011 345/156 |
| 8,335,666 B2 * | 12/2012 | Tian ........................ G06T 7/593 700/98 |
| 9,230,339 B2 * | 1/2016 | Wexler .................. G06T 3/0012 |
| 9,854,155 B1 * | 12/2017 | Sikka .................. H04N 5/23238 |
| 10,373,322 B1 * | 8/2019 | Buibas .................... G06T 7/246 |
| 2005/0117033 A1 * | 6/2005 | Matsui .................. G01S 3/7864 348/239 |

(Continued)

FOREIGN PATENT DOCUMENTS

EP 2044573 B1 2/2015

*Primary Examiner* — Shervin K Nakhjavan
(74) *Attorney, Agent, or Firm* — Michael Best & Friedrich LLP

(57) ABSTRACT

A method for setting a camera, in particular of a monitoring device, comprising a recording of an image of a region to be monitored, an analysis of the recorded image to associate at least one image region of the image with an object, identification of the object on the basis of the acquired image region and ascertainment of a size of the object by access to stored size information of the identified object and a scaling of the image region associated with the object in the recorded image to scale the remaining acquired image and/or to determine a distance of the camera to the acquired object.

10 Claims, 3 Drawing Sheets

(56) References Cited

U.S. PATENT DOCUMENTS

| | | | | |
|---|---|---|---|---|
| 2006/0045381 A1* | 3/2006 | Matsuo | H04N 19/139 | 382/276 |
| 2007/0024704 A1* | 2/2007 | Lin | G06K 9/00362 | 348/135 |
| 2009/0116732 A1* | 5/2009 | Zhou | H04N 13/139 | 382/154 |
| 2010/0150458 A1* | 6/2010 | Angell | G06F 16/70 | 382/224 |
| 2010/0260426 A1* | 10/2010 | Huang | G06K 9/00671 | 382/218 |
| 2013/0101158 A1* | 4/2013 | Lloyd | G06T 7/62 | 382/103 |
| 2013/0120224 A1* | 5/2013 | Cajigas | G09G 5/00 | 345/8 |
| 2014/0071044 A1* | 3/2014 | Nam | G06F 3/011 | 345/156 |
| 2014/0104416 A1* | 4/2014 | Giordano | G01B 11/02 | 348/135 |
| 2014/0119609 A1* | 5/2014 | Lee | G06K 9/00805 | 382/106 |
| 2015/0317784 A1* | 11/2015 | Oshima | H04N 13/363 | 348/54 |
| 2015/0329217 A1* | 11/2015 | Kirk | G08G 5/0078 | 701/301 |
| 2015/0362579 A1* | 12/2015 | Hesch | G06K 9/209 | 702/104 |
| 2016/0169671 A1* | 6/2016 | Winter | G01C 15/00 | 73/1.75 |
| 2016/0275359 A1* | 9/2016 | Yoshida | G01S 17/86 | |
| 2017/0011519 A1* | 1/2017 | Ohba | G06F 3/0346 | |
| 2017/0116496 A1* | 4/2017 | Fung | G06K 9/2054 | |
| 2017/0169570 A1* | 6/2017 | Vashishtha | G06K 9/4633 | |
| 2017/0202450 A1* | 7/2017 | Carrafa | A61B 3/0033 | |
| 2017/0280026 A1* | 9/2017 | Uejima | G06T 7/215 | |
| 2017/0371035 A1* | 12/2017 | Anvari | G01S 13/867 | |
| 2018/0205875 A1* | 7/2018 | Nakamaru | G06T 7/50 | |
| 2018/0211410 A1* | 7/2018 | Taylor | G06K 9/4604 | |
| 2018/0286079 A1* | 10/2018 | Ben Moshe | H04N 5/23222 | |

\* cited by examiner

METHOD FOR SETTING A CAMERA

BACKGROUND OF THE INVENTION

A monitoring camera and a method for calibrating the monitoring camera are already known from EP 2 044 573 B 1. The monitoring camera, which is positioned at a stationary monitoring position, has a calibration assistance device, which assists during a calibration of the monitoring camera. In this case, the calibration assistance device is designed as a sensor and computer unit for ascertaining a stationary monitoring position of the monitoring camera, wherein the stationary monitoring position comprises the absolute position and orientation of the monitoring camera. By means of a calibration module, items of environmental information in the form of digital environmental maps or digital building plans are combined with the stationary monitoring position of the monitoring camera ascertained by the calibration assistance device to calibrate the camera, wherein the actual viewing angle of the monitoring camera is ascertained. A calibration of the monitoring camera is used in this case for the purpose of being able to convert the sizes of objects measured in pixels in the image data streams of the monitoring camera into metric units. In this manner, the actual physical size can be specified for a detected object. It is then also possible to specify velocities or accelerations of the object in metric dimensions. In this case, the data required for the calibration are ascertained without a user interaction with the aid of the calibration assistance device designed as a sensor and computer unit and are then available for an image analysis.

SUMMARY OF THE INVENTION

A method according to the invention for setting, in particular for calibrating a camera has the advantage in this case that a corresponding calibration of the acquired camera image can be carried out solely from an analysis of the recorded image. For this purpose, the camera is firstly arranged at a desired position and then set. During the setting, an image is recorded, wherein an automatic analysis of the recorded image follows. For this purpose, an object is associated with at least one image region of the recorded image. Subsequently, an attempt is made to identify the object. For this purpose, the object is compared, for example, to a variety of images of stored objects. If it is established that the object is a known object, the external dimensions of which are known, these known external dimensions can then be related to the pixels of the recorded image which the object occupies in the recorded image.

If an object identified in the recorded image has a known height, the corresponding extension in the recorded image, for example, the number of pixels, which corresponds to the height of the object in the image, can thus be equated to the known height. The object can thus be used for the purpose of scaling the camera image while utilizing this known dimension. Ideally, width, height, and depth of an object can be determined, and therefore a three-dimensional scaling of the image is enabled. Multiple objects are preferably identified in an image region, and therefore a scaling in various image regions is possible.

If the size of an object is known, a distance of the camera to the object can also be determined in consideration of a known focal length of an optical unit of the camera. A distance determination of the camera to the object and/or a scaling of the recorded image in one or more spatial directions is thus possible, without additional sensors having to be queried for this purpose. A scaling of the recorded image and thus a calibration or an initial setting of a camera is thus facilitated. Moreover, a hardware expenditure is reduced, since except for the computer unit for the analysis of the recorded image and possibly a storage unit or an interface for querying items of information for identification of objects in the image, no further items of information have to be provided to the camera. In particular, it is not necessary for a user to perform corresponding measurements themselves and input them into the camera.

It is thus advantageous to compare an external shape of a recognized object to the expected shape in the case of a frontal view, in order to determine an alignment of a surface normal of the object to the camera from the comparison. A scaling of the image can be improved in this way, since the alignment of the object to the camera is then known and it can thus be established, for example, that an object faces with its surface normal not toward the camera but rather in a deviating direction and therefore a constant scale is also not to be used for the scaling but rather a floating scale over the recorded image.

Furthermore, it is advantageous to acquire at least one symbol within the image region associated with the object and analyze it as a supplementary item of information for an identification of the object. This can be, for example, a model description or a brand identification of an object. Furthermore, however, it is also possible that an information symbol, for example, a QR code or a barcode, is applied to an object, to facilitate an identification of an object. This is advantageous in particular if a particular scaled object is introduced in a field of vision of the camera for simplified calibration of the camera at a position. This is because a probability of a correct object recognition and association can be simplified via such a symbol, which is easy to acquire and interpret for a camera.

Furthermore, it is advantageous to additionally take into consideration an input acquisition of a user. In this way, the user can confirm a correct recognition of an object, in particular in doubtful cases of an automatic identification which has been carried out. Furthermore, however, it is also possible that a user inputs additional items of information known to him with respect to an object in a simple manner, and therefore, for example, items of size information which are not known to the user can be retrieved. Thus, for example, a user can input items of model information of a device, which has been recognized as the object. Although items of size information are not known to him, they can be retrieved from a storage unit, in which the items of size information are present, or via a data network in consideration of the additionally input items of information. In this way, the recognition accuracy of an object and thus the scaling are improved, without a user having to input items of detail information or size information. Rather, he can input the items of information known to him, which are then analyzed. Items of identification information or further items of information with respect to the identified object can thus be output to a user, and therefore a user can establish whether a recognition has taken place in a correct manner.

Furthermore, it is advantageous to transmit a dataset associated with the object, in particular data of the image region associated with the object, to a search algorithm for identifying the object, and therefore an identification of the object can take place in a simple manner by means of an algorithm. In particular, an identification of an object while utilizing a trained neuronal network in which possible identifiable objects are already stored is advantageous. In the case of an application of the camera in the household, for example, devices typical in a household, for example, domestic appliances or entertainment electronics devices can be stored. In addition to domestic appliances, items of furniture, for example, cabinets or tables, can also be analyzed. Furthermore, however, it is also possible to use other domestic objects such as cups, flatware, magazines, or books. In the case of an industrial use, these can be, for example, devices which occur frequently in manufacturing, such as production machines or standardized packaging materials, for example, palettes or wire mesh boxes.

For subsequent monitoring of an image region recorded by the camera, the scaling is carried out or used not only for the image just recorded, but rather also for images subsequently recorded by the camera thereafter, in particular if the camera is arranged fixed in place. In this case, the object used for the scaling in the initially recorded image can also have been removed from the acquired image again.

Furthermore, a monitoring device comprising means which are suitable for carrying out the steps of the method and a corresponding computer program and a computer-readable medium on which the computer program is stored are provided with corresponding advantages.

BRIEF DESCRIPTION OF THE DRAWINGS

Exemplary embodiments of the invention are illustrated in the drawings and explained in greater detail in the following description. In the figures.

DETAILED DESCRIPTION

The method according to the invention for setting a camera can be used for arbitrary camera devices. It is advantageous in particular for cameras which, arranged or installed fixedly, are used for monitoring a specific scene to be observed, i.e., a specific spatial region inside or outside a building, which is to be monitored. The task of the camera is in this case not only to record the respective image, but rather also to recognize and analyze objects, in particular moving objects, and changes in the spatial region to be monitored. However, to be able to recognize objects reliably in this case and, for example, be able to recognize a movement of a human, a camera setting in the sense of a camera calibration is necessary, in order to be able to unambiguously associate objects within a recorded image within the space to be observed with an extension in this three-dimensional space. Using the method according to the invention, a calibration step to be performed after installation of the camera is both simplified and also carried out reliably, and therefore a subsequent analysis of the acquired image can take place reliably. In this case, an acquisition of a size by the camera is enabled after completed calibration for arbitrary objects in the scene, without dimensions or size specifications having to be input manually by a user.

Figure 1:
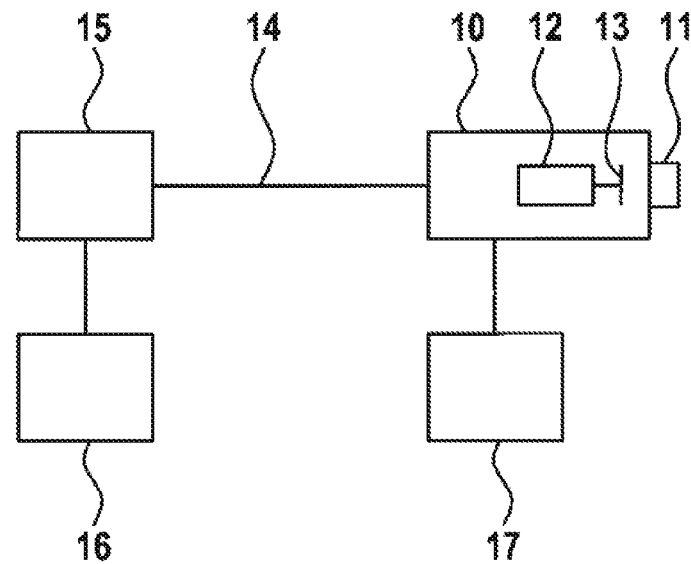
FIG. 1 shows a monitoring device for carrying out the method.

FIG. 1 shows a camera 10, which observes a spatial region via an optical unit 11. A computer device 12 analyzes the image acquired by the camera 10 via the optical unit 11, which is acquired, for example, via an image acquisition unit 13, for example, a CCD component. After the camera is turned on the first time or upon a request by a user, the camera 10 carries out a setting method. This is explained by way of example on the basis of the exemplary scene of FIG. 2.

Figure 2:
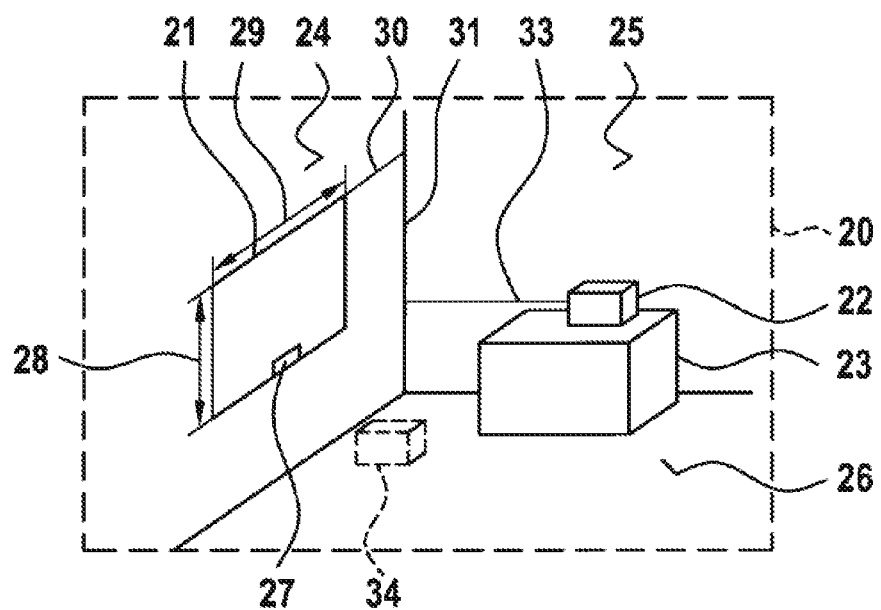
FIG. 2 shows an exemplary field of vision of the camera having objects located therein.

FIG. 2 shows an image 20 recorded by the camera 10. Multiple objects are identified in this image 20, a first object 21, a second object 22, a third object 23, and also a first surface 24, a second surface 25, and a third surface 26, for example, on the basis of different coloration and/or structure of the respective image regions. The image regions associated with the objects are subsequently supplied to a separate analysis to identify the objects. This identification can take place in the computer unit 12. However, the camera 10 can also be connected via a data connection 14 to a computer device 15, for example, via a data network or via a near field communication connection. An attempt is made in the computer device 15 to assign the respective image region, with access to a storage device, to an object assigned in the storage device 16. In a first embodiment, the recorded image region can be compared in this case to stored items of image information, which are saved in the storage device 16. In particular, the storage device 16 is embodied together with the computer device 15 as a neuronal network, by means of which an image analysis of the image region takes place. The stored objects in the storage unit 16 are stored as much as possible with a size specification in this case, and therefore this item of size information can be fed back via the data connection 14 to the camera 10 after a successful object identification.

Thus, for example, in FIG. 2, the first object 21 is recognized as a television. Ideally, the size of the television is also ascertained on the basis of the appearance of the object 21. If this item of information should not yet be sufficient, in a first embodiment, it can thus be output to a user via an input/output interface 17, for example, a smart phone, a tablet computer, or via another suitable computer device, that the first object 21 was recognized as a television. The user can now be requested to input a model identification of the television. In consideration of the model identification, the storage device 16 can then again be accessed to also determine an item of size information of the television in consideration of the item of model information. In another embodiment, the computer device 15 can also be aligned for the purpose, however, of independently carrying out a search in a data network, for example, the Internet, to ascertain a dimension of the television. In a further embodiment, a symbol 27 which is arranged on the first object 21 can be acquired by the camera 10 and relayed to the computer device 15 for analysis. In this case, this can be a brand identification or a model identification of the first object. This information is preferably also taken into consideration during the identification of the object.

In one embodiment, an identification of the first object, for example, "television of the brand XY and the model Z" can optionally be indicated to a user via the input/output interface 17 after a completed identification. The user can now be requested to confirm or deny this identification.

If the dimensions of the first object, for example, the dimensions of a specific television model, are now ascertained, an extension in a first direction 28 and an extension in a second direction 29 can thus be used for scaling the image information.

Since after an identification of the first object 21, a size of the first object, i.e., in the exemplary embodiment shown here of the television, is known, it can moreover be established in consideration of the focal length of the camera how far away the first object is located from the camera 10. A determination of the distance between the first object 21 and the camera 10, which acquires the first object 21, is thus also possible. This information can also be used for a setting of the camera 10.

Furthermore, the second object 22 is identified, for example, as a toaster of a specific model. Dimensions are also known for this object in the exemplary embodiment shown here, and therefore a size determination and subsequently a scaling can also take place for the second object 22.

For the third object 23, a bureau, no size dimensions exist in the storage device 16, for example. "Third object was identified as a bureau, but the size specification thereof is not known" can be displayed to the observer via the input/output interface 17. A user can now either input the dimensions of the bureau or he can input, for example, a model identification of the bureau, which can be used for an identification of the size information.

Furthermore, the camera has recognized a first surface 24, a second surface 25, and a third surface 26. Because the third object 23 stands on the third surface 26, the third surface 26 is acquired as a floor surface. The first and the second surfaces 24, 25 are accordingly acquired as wall surfaces. By means of the already provided scaling by the first and the second objects 21, 22, for example, a distance 30 of the first object 21 to a transition line 31 between the first wall surface and the second wall surface and a distance 33 between the second object and the transition line 31 can be determined. A three-dimensional, scaled space is thus spanned in the scene visible from the camera 10 according to FIG. 2. This scaling can then be used for the purpose, for example, of estimating an object 34 introduced at a later point in time into the scene, which is shown by dashed lines in FIG. 2, with respect to its size by way of the computer device 12 and thus establishing, for example, whether this object represents a hazard or not or whether the object is, for example, a person.

Figure 3:
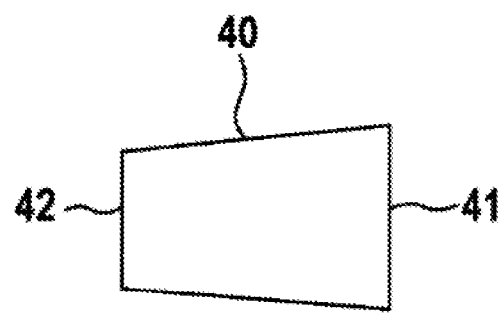
FIGS. 3 and 4 show various views of an object to be identified.
Figure 4:
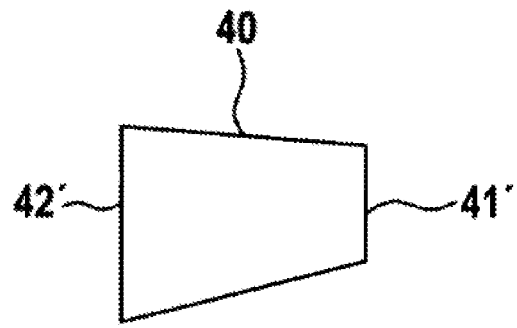

In order to acquire an alignment of an object in the space accurately, moreover a normal vector of a surface, which faces toward the camera, is advantageously determined. A method for this purpose is shown on the basis of FIGS. 3 and 4. FIGS. 3 and 4 show a front side of a television, which is shown at different angles in relation to a camera observing it. In FIG. 3, a right side 41 of the television 40 is closer to the camera than a left side 42. In FIG. 4, the left side 42' is arranged closer than the right side 41'. This has the result that in FIG. 3, the right side 41 appears longer than the left side 42 and, in FIG. 4, the left side 42' appears longer than the right side 41'. However, since the two side edges are actually of equal length, it can be easily computed on the basis of this length comparison at which angle the television stands in relation to a camera observing it. If it is known that an object thus has a regular, rectangular shape, it can be established by an analysis of the length ratio of the left and the right sides how a normal vector of the surface, the rectangular surface, stands on the surface facing toward the camera in relation to a viewing direction of the camera. If an object, for example, the first object 21 according to FIG. 2, is arranged on a wall, this item of information can be used accordingly for the scaling of the wall.

Figure 5:
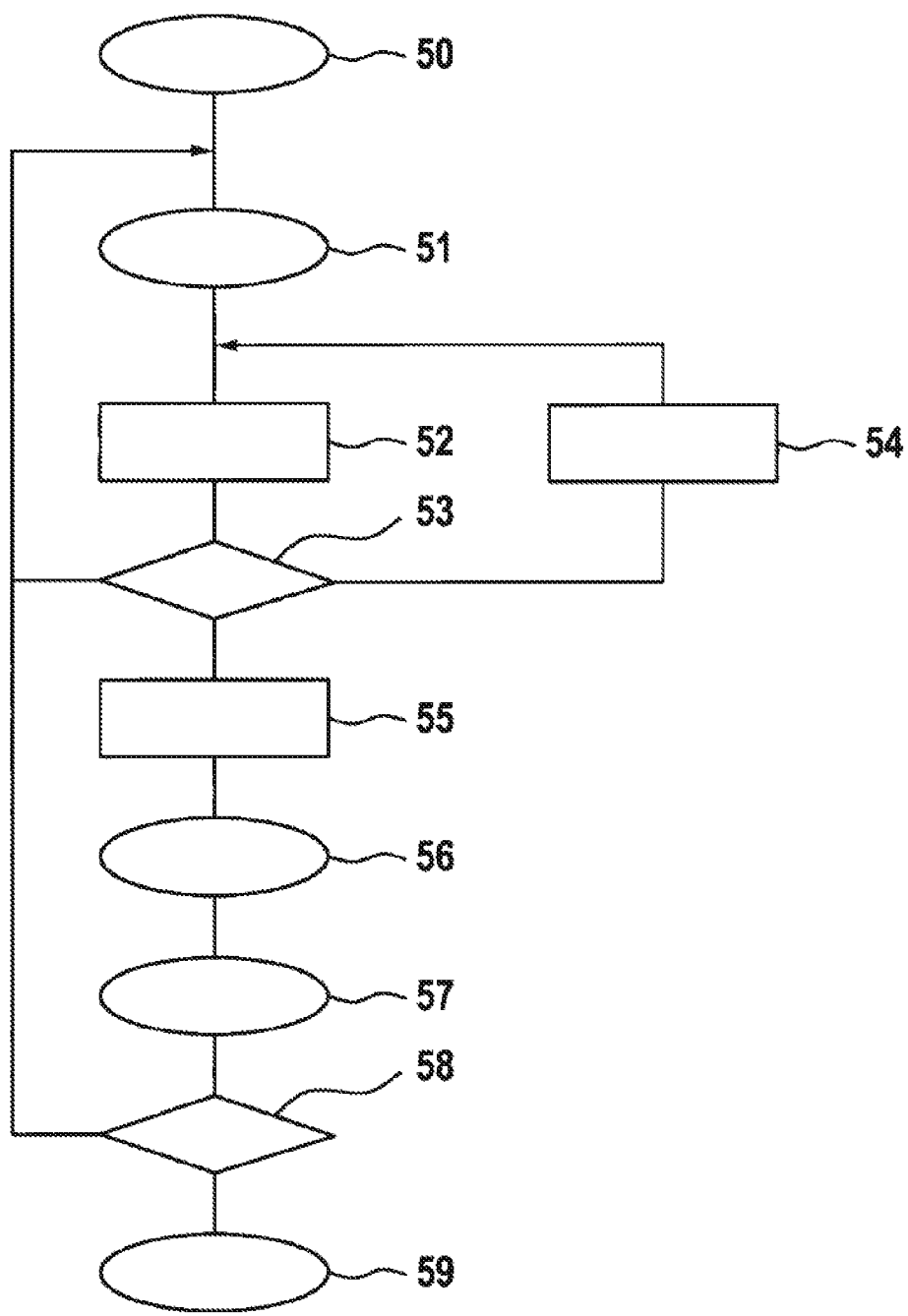
FIG. 5 shows an exemplary embodiment of a method sequence.

An exemplary embodiment of a method sequence according to the invention is shown in FIG. 5. In an initialization step 50, a calibration of the camera is started either automatically or manually. In a subsequent image recording step 51, an image of a scene is recorded by the camera. In a subsequent analysis step 52, a search is made for image regions which are possibly to be associated with an object.

In this case, these are in particular surfaces which have a similar color and/or a comparable structure. In a subsequent checking step 53, it is checked whether an object was able to be identified. If this is not the case, the sequence thus branches back to the image recording step 51. If an object was recognized, the object is thus identified in an identification step 54. The analysis step 52 is continued until no further objects are present. Subsequently, an item of size information for the individual objects is determined in an ascertainment step 55. In a subsequent scaling step 56, a scaling of the acquired image is carried out. In an optional output step 57, the acquired scaling dimensions and/or items of information on the acquired objects are displayed to a user. In a query step 58, a user can now confirm the acquired scaling which was carried out, the calibration method is then ended in an ending step 59 and the ascertained scaling is used for subsequent image analyses. Otherwise, the sequence refers back from the query step 58 to the image recording step 51.

In a further embodiment, it is also possible to introduce a standardized object, for example, a cube having 25 cm edge length, at various positions in an image. This cube can be identified separately by a barcode, for example, and therefore it can be easily acquired by the camera.

In addition to a scaling using a single image recording, it is also possible to record an image sequence and to carry out a scaling for individual regions of the image in succession in the image sequence.

The invention claimed is:

1. A method for setting a camera, the method comprising:
   recording of an image of a region to be monitored,
   analyzing the recorded image to associate at least one image region of the image with an object,
   identifying the object on the basis of the acquired image region,
   ascertaining a size of the object by accessing an item of stored size information of the identified object,
   determining, based on the ascertained size of the object, a first spatial scaling of the image region associated with the object in the recorded image by relating a known dimension of the object with a pixel dimension within the image, and
   determining a second spatial scaling of the remaining acquired image and determining a distance of the camera to the acquired object.

2. The method according to claim 1, further comprising ascertainment of coordinates of a boundary of the image region, determination of a shape of the image region from the coordinates, comparison of the ascertained shape to an expected shape of a view of the object in the case of a frontal view, and determination of a surface normal of a surface of the acquired object with respect to a viewing direction of the camera from the comparison of the ascertained shape to the expected shape.

3. The method according to claim 1, further comprising acquisition of at least one symbol in the image region associated with the object, association of at least one item of supplementary information from the at least one acquired symbol with the object, and use of the item of associated information for identification of the object.

4. The method according to claim 1, further comprising acquisition of an input of a user to input at least one additional item of information with respect to the object in the image region and use of the acquired item of information for identification of the object and/or scaling of the image region.

5. The method according to claim 1, further comprising output of items of identification information and/or further items of information with respect to the identified object.

6. The method according to claim 1, further comprising compilation of a dataset associated with the object and transmission of the dataset to a search algorithm for identification of the object.

7. The method according to claim 6, characterized in that the identification is carried out by a neuronal network.

8. The method according to claim 1, further comprising scaling at least one subsequently recorded image with consideration of the ascertained scaling and/or the ascertained distance of the camera to the monitored region.

9. A monitoring device comprising a camera and a computer for executing the steps of the method according to claim 1.

10. A non-transitory computer-readable medium having a computer program comprising commands which carry out the method steps of claim 1 when executed on a computer.

* * * * *